United States Patent Office 3,738,824
Patented June 12, 1973

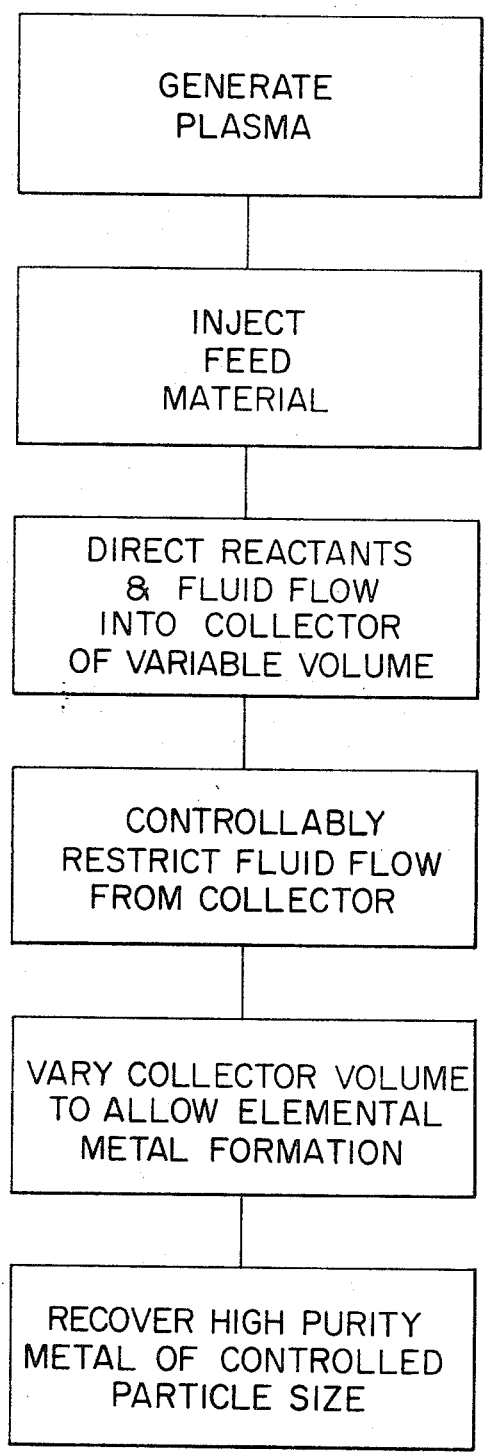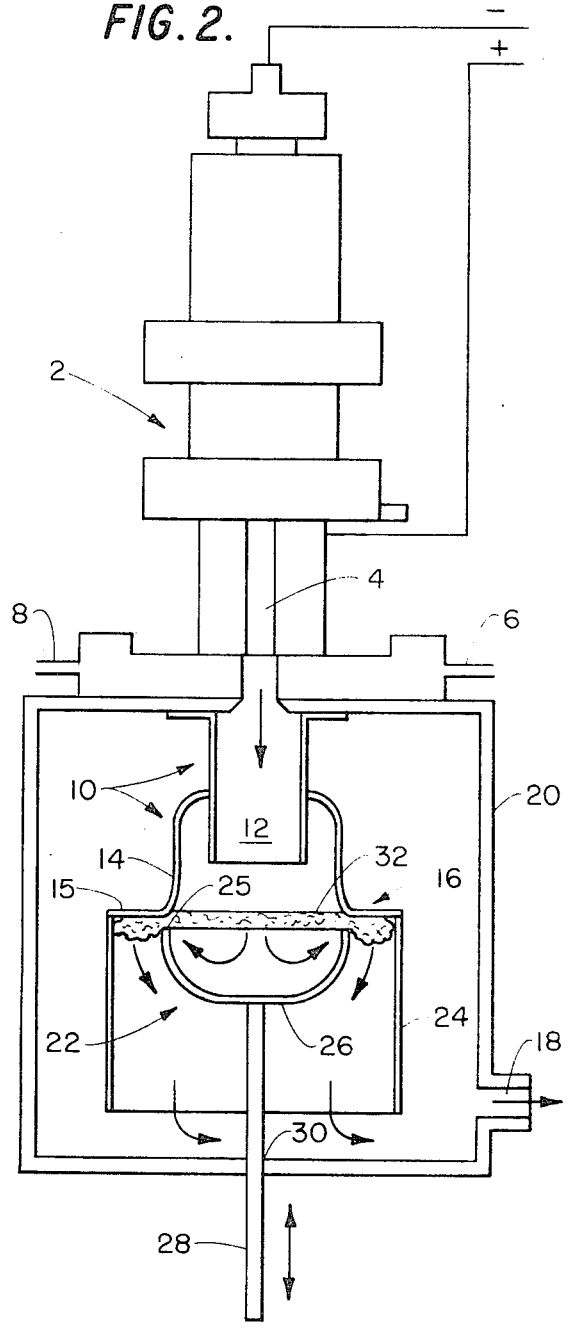
INVENTORS.
ROBERT D. DAVIS,
THEODORE N. MEYER AND
ROY L. BLIZZARD
BY MAHONEY, HORNBAKER
AND SCHICK
ATTORNEYS

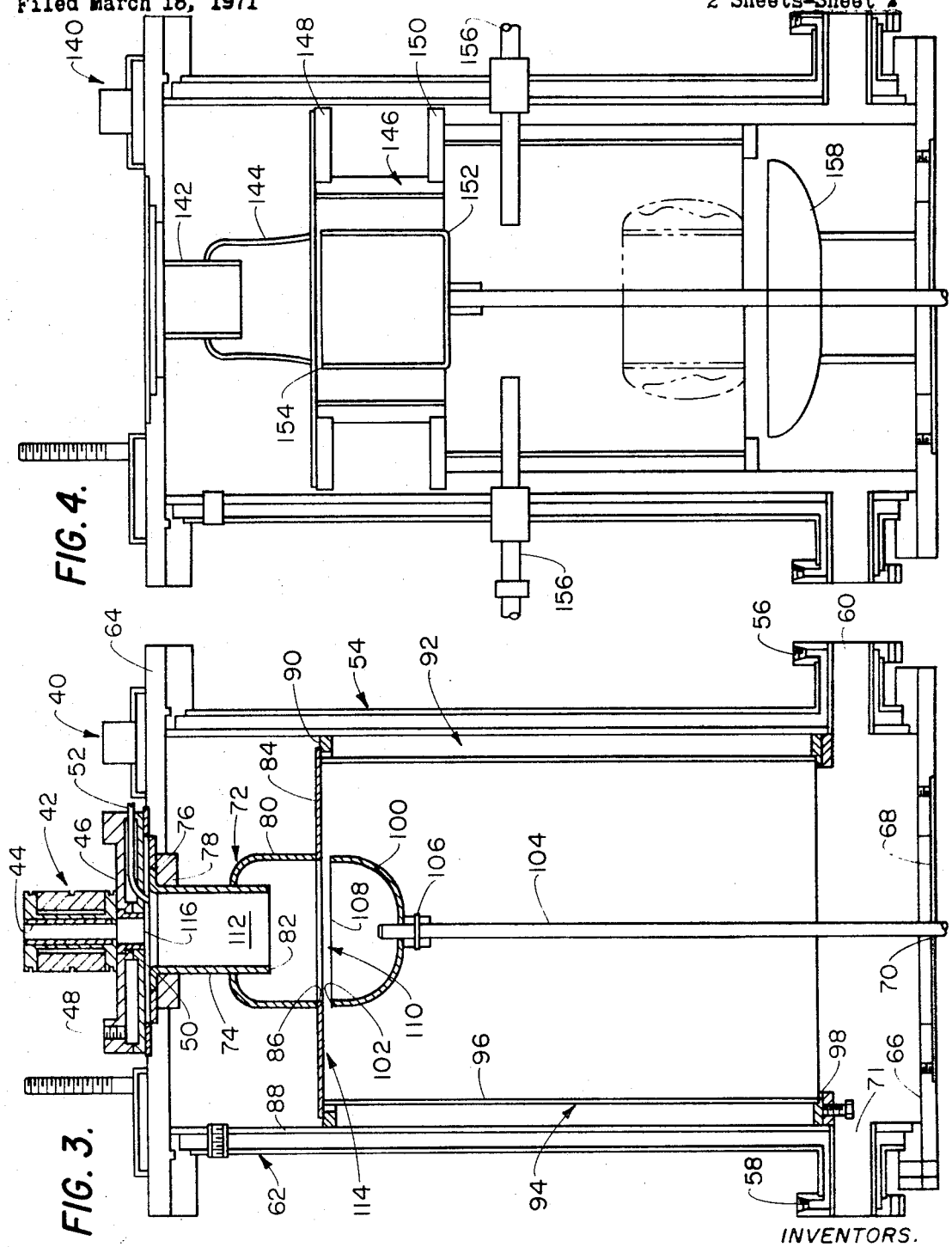

3,738,824
METHOD AND APPARATUS FOR PRODUCTION OF METALLIC POWDERS
Robert D. Davis, Newport Beach, Theodore N. Meyer, Westminster, and Roy L. Blizzard, Huntington Beach, Calif., assignors to Plasmachem, Inc., Newport Beach, Calif.
Filed Mar. 18, 1971, Ser. No. 125,589
Int. Cl. B22f 9/00; C22b 49/00, 61/00
U.S. Cl. 75—.5 B                                    11 Claims

ABSTRACT OF THE DISCLOSURE

In the process of producing elemental metal powders, especially refractory metals, using a plasma reactor, the reactant feed material is introduced into the reaction zone of the reactor and the effluent from the reaction zone is directed into a quenching zone through a selectively variable passageway or orifice in a manner that permits separation of the metal particles from the effluent hot gas stream and continuous collection of the metallic powder in a collection zone wherein the metallic powder is of a selected characteristic, controlled by the maintenance of certain operational parameters, including a selected differential fluid pressure in the collection zone as well as reaction and collection zone temperatures. Apparatus for carrying out the process is also disclosed.

BACKGROUND OF THE INVENTION

This invention pertains to a method and apparatus for producing elemental metallic powders. The invention is primarily directed to the refractory metals but not limited thereto. Exemplary refractory metals include, by way of example and not limitation, tantalum, tungsten, molybdenum and columbium. More particularly, the invention relates to a method and apparatus for producing high purity elemental metal powders of selected characteristics involving high percentage yields and selected particle size, shape and surface condition, all in a commercially feasible manner.

More specifically the invention is directed to the processes and apparatuses for producing elemental metal powders using a plasma reactor for carrying out the reaction.

For example, metallic halides, oxides and nitrides are reduced using a plasma reactor to the elemental metal and recovered in a relatively pure form and in quantities which have not been heretofore possible.

The prior art of gas-discharge physics is well aware of the means for conducting chemical reactions using a plasma flow or plasma jet. The chemical reactions with which this invention is involved are primarily reductions of metallic compounds with reductants such as, for example, hydrogen or carbon. Other reactions will readily suggest themselves to those of ordinary skill in the art as the disclosure proceeds herein.

The temperatures generated in a plasma reactor are relatively high and the reactions carried out therein have heretofore been primarily of a non-commercial nature, for a variety of reasons, some of the more common being because the reactors could not support sustained reactions without deleterious plugging of, for example, the anode chamber, or could only produce laboratory quantities of desired end products, which in most instances were not of a quantity or quality needed in commercial manufacturing processes, or because the product lacked certain essential characteristics, such as, for instance, size and shape of the product particles.

The present invention provides process and apparatus for the manufacture of elemental metals of the groups IV$b$, V$b$, and VI$b$ of the Periodic Table wherein a compound of said metals is reacted in a high temperature reaction zone produced by a plasma generator, in a manner to produce heretofore unavailable quantities of the metal of selected particle size at a satisfactory purity level, thus making the produced metals suitable for various commercial uses.

For instance, a present commercial need exists for tantalum powder of substantially pure form and having a particle size sufficiently large for the formation of electrodes for capacitors, of the dry or liquid type. The elemental metal, such as tantalum, obtained in the practice of the herein disclosed invention is of capacitor grade quality from which capacitors may be formed.

In the formation of elemental tantalum, a metallic metallic halide such as tantalum pentachloride is reduced in a plasma reactor, utilizing a reductant such as hydrogen, in a process wherein purity of the obtained tantalum is at a high level. The particle size of the metal is selectively controlled all in a commercially sustainable and feasible process producing copious amounts of the elemental metal at high percentage yields.

OBJECTS AND SUMMARY OF THE INVENTION

It is an object of the present invention to provide a process and apparatus for producing elemental metals.

It is another object of the invention to provide method and apparatus for obtaining metallic powders of high purity.

It is still another object of this invention to provide method and apparatus for the production of elemental metal powders of selected particle size, shape and surface condition.

It is still a further object of this invention to provide method and apparatus for the production of elemental metal powders using a plasma reactor to sustain a reduction reaction.

It is still another important object of this invention to recover elemental metal powder of selected particle size using plasma wherein selected fluid pressure control between a heated zone and a recovery zone is maintained to obtain the desired end product.

It is still a more specific and further object of this invention to provide a method and apparatus for reducing metallic compounds to the elemental metal form in a plasma reactor.

It is still a more further specific object of this invention to provide method and apparatus for the reduction of metallic halides, oxides and nitrides to the elemental metal.

It is still another further object of this invention to provide a method and apparatus for the reduction of metallic halides in a plasma reactor wherein the reactant is introduced into a reaction zone of the plasma reactor and elemental metal is collected in a collection zone.

It is still a more specific and further object of this invention to provide a method and apparatus for the production of elemental metal in a plasma reactor wherein the effluent from the reaction zone flows through a collection zone wherein selective control of differential pressure and temperature between said zones permits particle formation of the metal in a selective manner.

It is still a more specific and further object of this invention to provide method and apparatus for reducing refractory metal compounds for example, tantalum, tungsten, molybdenum and columbium compounds to the elemental metallic state wherein such metals are of high purity and of selected particle size.

It is still an even further more specific object of this invention to provide a plasma reactor process for producing elemental metals wherein the metal reactant is introduced downstream of the anode of said reactor and the effluent flow from the reactor is directed through a selectively variable passageway in a selectively controlled manner into a collector zone wherein elemental metal is collected.

It is still a further and even more specific object of the invention to provide a method and apparatus for reducing metallic halides, for example columbium pentachloride or tantalum pentachloride in a hydrogen plasma reactor process wherein the metallic compound is introduced downstream of the anode and the effluent from the reaction zone is passed through a temperature gradient zone within which a collector is positioned to selectively vary the passageway for the effluent flowing through said temperature gradient zone.

Other objects and advantages of the invention will be apparent from the following specification and the accompanying drawings which are for the purposes of illustration only.

Basically in an exemplary embodiment the method of the invention comprises a process for producing elemental metals wherein a reactant is introduced into a plasma reactor, downstream from the anode of the reactor and the effluent flow from the reaction zone is directed through a selectively variable passageway, in a selectively controlled manner, into a collecting zone wherein elemental metal in relatively pure form and having a selected particle size is obtained while maintaining selective control of the effluent flow.

One means of conducting the above process is through the use of a plasma reactor apparatus comprising the combination of a reactor chamber having a cathode and an anode within which a plasma arc is generated. A reaction zone member communicates with said reactor chamber into which reactant feed material is introduced downstream of the anode. A quench member comprising said reaction zone member directs the flow of effluent thererfrom through a directed path and a collector means is positioned within the quench member and path, thereby forming a selectively variable passageway through which the effluent flows. By allowing elemental metal to collect on the collector means, by maintaining a selected pressure differential between the reaction zone and the collection zone, and by maintaining selected temperatures in the reaction zone and collection zone, a selected product of reaction is obtained from the effluent.

BRIEF DESCRIPTION OF THE DRAWINGS

FIG. 1 depicts a flow diagram for practice of one method of the invention.

FIG. 2 schematically illustrates an examplary apparatus for the practice of the method disclosed in FIG. 1.

FIG. 3 is a fragmentary view of a plasma reactor utilizing a specific embodiment of the invention.

FIG. 4 is a fragmentary view to the reactor shown in FIG. 3, but modified for practice of the invention on a continuous basis.

DESCRIPTION OF THE BEST EMBODIMENTS CONTEMPLATED

As an introduction, a brief general description of the inventive method and apparatus will be beneficial in understanding the scope and breadth of the invention.

Referring to FIGS. 1 and 2, one specific method of the inventive process and exemplary apparatus for practicing the process are illustrated. The plasma generator 2 is generally of the conventional type having the usual cathode and anode suitably connected to a power supply so that a potential across the anode zone 4 is produced. The introduction of a stabilizer or inert gas or alternatively, of a reactant gas, into the anode zone 4 produces a reactive plasma generally within anode zone 4 extending axially downward in direction of the arrow shown in FIG. 2.

Thus far, the plasma generator described is wholly of prior art type but modified so that a feed material, comprising a refractory metal compound and from which elemental metal is to be obtained, is fed via inlet 6 by itself (or in some instances with a feeder or carrier gas, as will become apparent) so that the feed material is introduced downstream of the anode and approximately into the generated plasma. Feeding the feed material in this manner effectively prevents reaction product buildup on the anode surfaces.

Where a stabilizer gas is used to generate the plasma, the carrier gas for the feed material may also comprise a reactant gas such as hydrogen, where the refractory metal compound is to be reduced, and/or a reactant gas may be introduced adjacent the point of feed material introduction as by means of reactant gas inlet 8. The feed material and reactant gas are carried by the plasma into what may be considered an axially extending reaction member 10. Member 10 is made of a material which is preferably inert to the reactants and reaction conditions (one such material being tungsten). Other refractory metals will also suffice and will be chosen for their ability to withstand the high temperatures involved; will not suffer erosion and will not contaminate the elemental metal sought to be recovered.

The member 10 generally defines the principal reaction zone 12 from which effluent flows through the lower portion 14 of member 10 and into a collector means generally designated 16 and through an outlet 18 provided in the wall of quench member 20.

As illustrated, the reaction zone 12 and a collector zone 22 are located within the confines of quench member 20 of the usual fluid-cooled type. Collector means 16 comprises, in this instance, a cylindrical, sleeve-like member 24 also of an inert material, the wall thereof extending upwards, into substantially fluid-tight engagement with horizontal portion 15 of the outwardly flared wall 14 of member 10. Disposed within sleeve 24 generally defining collection zone 22 is the other portion of collector means 16, collector cup member 26 having a peripheral edge 25. It will be noted that a temperature gradient is established between the elongate upper portion of member 10 and the flared wall portions 14 thereof.

Collector cup 26 is generally of cup configuration having a major peripheral configuration coinciding with the flared wall portions 14 of member 10. A support member 28 is secured to the bottom of collector cup member 26 and extends through an aperture 30 provided in the bottom wall of quench member 20 in a manner that allows axial movement of collector cup 26, in the direction of the arrow, substantially through the entire length of sleeve 24. Theoretically, member 10, in combination with the interior surface of collector cup member 26, generally defines the boundaries of reaction zone 12, although the principal reaction of the reactants take place upstream of the collector cup member 26.

For obvious reasons, the materials of construction of the member 10, at least the interior of sleeve 24, cup member 26 and support member 28, are fabricated of materials inert to the reaction conditions, reactants and resultant elemental metal.

In practice of the method using the apparatus schematically illustrated, a gap between the horizontal wall portion 15 and the edge 25 of cup member 26 forms a passageway 32 which is selectively variable to control the effluent flowing from reaction zone 12 through the outlet 18. The passageway 32 because of the axial movement of collector cup 26 may be selectively varied for purposes which will be described and become apparent.

At initiation of the process, the cup member 26 is positioned so that the passageway 32 is a small one from about .0312 to .500 inch, with an initial spacing of about .1250 generally being sufficient. After a period of time, elemental metal from the effluent flowing through the passageway 32 and in the manner shown by the arrows, begins to build up in sponge form on and about the edge 25 and grows to the outer extremities thereof to the interior wall of sleeve 24 substantially as shown. The sponge is initially donut shaped and because of its position impedes the flow of effluent through passageway 32 but performs a beneficial function in that the effluent when flowing through the interstices of the donut deposits still more metal particles allowing for greater recovery Periodically the support member 28 is moved axially downward to maintain the passageway 32 sufficiently large to allow passage of the effluent and to allow further buildup of the metallic sponge, the height or depth of which will extend substantially the entire length of sleeve 24 to thereby produce what may be considered a metallic sponge elongate donut of irregular cylindrical shape.

At the completion of the run, the collector 16 may be removed from the confines of quench member 20 and the elemental metal scraped off of the interior of the sleeve 24 and the surfaces of collector cup 26. The recovered elemental metal is of exceptionally high purity and of unique characteristic having an apparent Fisher Sub sieve particle size within the range of from about 0.5 to 12 microns, and larger, depending upon the conditions under which the collection is carried out. Generally, particle sizes within the one to ten micron range will be formed. As will be more fully set forth hereinafter, the particle size of the recovered metal may be selectively controlled by varying the size of the passageway 32 through which the effluent of the plasma reactor passes.

In some instances, it will be desirable to recover sub-micron metal particles, or fines which may be reintroduced as feed material itself or in conjunction with other feed material. The flow-through or waste effluent is withdrawn from the system through outlet 18 and may be passed into suitable heat exchangers, separators or other conventional recovery equipment. Where introduced as feed material alone, the refractory metal fines are formed into larger particles, of selected size, as for example, the 10 micron size.

The plasma generator should be adjusted to obtain a neutral gas temperature in the plasma reactor sufficiently high (2000° K. to 5000° K.) to obtain the desired chemical reaction. As a rule, the reaction is carried out under atmospheric pressure or slightly above.

Various gases may be used to stabilize the plasma, such as inert gases as for instance, helium or argon, or reactive gases as for instance, hydrogen, nitrogen or methane. The type of stabilize rgas used to generate the plasma and the power input to the generator will necessarily dictate the temperatures generated thereby.

The power input into a plasma generator will for the most part determine the intensity of the reaction generated in the plasma stream and may be varied, keeping in mind the aforementioned criteria.

In order to obtain proper mixing and to carry the feed material into the reaction zone, a carrier or feeder gas may be found to be desiable. The feeder gas may be one of the stabilizer gasses mentioned above or may be a reactant such as hydrogen where reduction of a metallic compound is contemplated. Thus in some instances, one of the reactants such as hydrogen may be used to generate the plasma stream and also to carry the feed material into the reactor. This will be found to be desirable when considering that high yields using the method of the invention are obtained by having excess stoichiometric amounts of hydrogen available for the reduction.

Ease of conversion and the amount of conversion, where it is desired to reduce a refractory metal compound for example, such as tantalum pentachloride, to tantalum by reduction with hydrogen gas, are dependent on the excess hydrogen ratio over the stoichiometric amount required to obtain substantially complete conversion of the tantalum pentachloride to tantalum metal. Desirably excess hydrogen ratios are employed which provide substantially complete conversion at the particular reduction temperatures and pressures employed. An hydrogen excess of about 5 to 15 with the average being about 10 to 12 times the stoichiometric amount, at a temperature range of about 2500° K. to 3000° K. will permit substantially complete conversion.

Some preheating of the stabilizer gas and/or feeder or carrier gas may under some conditions be found to be useful. Generally, no preheating is necessary. However, where it is desired to introduce the feeder material in the vaporized state with a carrier gas, preheating of the carrier gas may be necessary in order to feed material in the vaporized state. It has been found, however, that vaporization and/or preheating of feed material or the carrier gas is not necessary.

The types of feed materials that are contemplated in the practice of the invention may be elemental metal fines obtained as waste or by-products in other processes or as by-products in the practice of one of the methods of this invention and wherein it is desired to obtain substantially larger particle sizes than the sub-micron particle size of the fines.

In other instances and as will be more commonly encountered, the reactant feed material will be a refractory metal compound from which the elemental metal is sought to be recovered. Thus examples of elemental metals which will be recovered generally include those previously mentioned and more specifically tantalum, molybdenum, tungsten and columbium or niobium. The halides of these metals as well as oxides are also suitable and will include such exemplary compounds as tantalum pentachloride, columbium pentachloride, tungsten pentachloride and molybdenum pentachloride. However, other chlorides such as $TiCl_4$, $HfCl_4$, $VCl_4$, $WCl_6$ and similar compounds may be used. Generally, any of the compounds wherein the chemistry is generally known and has heretofore been demonstrated in the art will suffice in the practice of the invention. Hence, reduction to the elemental metals using carbon, sodium and the like are also contemplated. Illustrative are the hydrogen reduction of ammonium paramolybdate $[(NH_4)_6Mo_7O_{24}—4H_2O]$ and tungsten trioxide $[WO_3]$, as well as carbon reduction of oxides.

The purity of the elemental metal produced by the process of the invention is dependent to a great extent on the purity of the reactants, i.e. refractory metal fines, refractory metal compounds and the other reactants such as a reductant, for example hydrogen. Also playing an important role are the materials comprising the reactor and the apparatus in which the process is practiced. Thus, materials commonly used for high temperature applications and which are substantially chemically inert and resistant to the reactants at the particular process conditions with the particular feed material being used, will be found to be desirable.

Desirably, the reactor and collector portions of the apparatus will be fabricated of or lined with the elemental metals sought to be recovered or one of the other commonly and commercially available refractory metals such as for example, tungsten. To insure high purity, the apparatus may be cleansed with an inert purge gas such as argon or helium, prior to commencing the practice of the method of the invention. These matters as well as others are generally well known in the metallurgy art and need not be delved into in great detail herein.

Referring now to FIG. 3, a specific apparatus and method of carrying out one embodiment of the invention will be described. Reactor 40 is illustrated as being of the conventional type having the usual reactor head 42 (only the anode portion of which is illustrated). Anode structure 44 is appropriately water cooled and is positioned in axial alignment with feed collar member 46 also appropriately water cooled by means of water inlet 48 and appropriate water lines, not shown. Collar 46 is annular in configuration and is provided with an inner liner 50 of an inert material such as boron nitride. Feed material may be introduced by means of a plurality of lines or one feed line 52 through feed collar 46. The introduction of additional reductant, stabilizer gas or the like through lines, not shown, may also be provided, although the primary stabilizer gas and reductant inlets are provided in the reactor head 42 above the anode structure 44 and are not shown herein.

Positioned below anode structure 44 is quench fixture or tank 54 of the conventional water-cooled type being provided with water inlet 56 and water outlet 58 so that cooling fluid may circulate in conventional fashion. A viewport 60 may be provided in the wall of quench tank 54. Other viewpoints located generally at 62, not shown, may also be provided so as to be able to view the interior of the quench member 54. Quench tank 54 is secured to reactor head 42 in fluid-tight relationship by means of a header 64 in conventional fashion and is provided with bottom wall 66 having removable cover 68 which is provided with through hole 70 for purposes which will be described. Effluent outlet 71 is provided in the side wall of quench member 54.

Positioned downstream of anode structure 44 and collar 46 is a reaction zone member, generally designated 72, comprising throat member 74 having an upper flanged portion 76 supported by means of support collar 78 provided for that purpose. Secured to the lower end of throat 74 of member 72 is cup member 80 of bell-like configuration disposed about throat 74 so that the terminus portion 82 of throat 74 extends well into the interior of cup 80. Cup 80 is here shown as supported by plate 84. Plate 84 is provided with a central opening 86 congruent in size and shape with the inside peripheral edge of cup member 80.

Plate 84 is supported from the interior wall 88 of quench tank 54 by means of ring support 90 which is welded or otherwise secured to interior surface 88.

Positioned within the interior of quench tank 54 and below plate 84 is liner 92 comprising a tubular sleeve having carbon wall 94 and inner lining 96 of an inert material. Liner 92 may be supported by bottom support ring 98 in the manner shown.

Disposed within the confines of liner 92 is collector cup member 100 of general cup configuration having a flanged edge 102 and being supported from the bottom thereof by means of rod 104 secured by means of bushing and pin assembly 106. Rod 104 extends through bore 70 in removable cover plate 68 and supports cup member 100 in an axially shiftable manner so that cup 100 may be moved toward and away from plate 84 in an axial direction substantially the entire length of liner 92. It will be noted that the surface of plate 84 inwardly directed toward cup 100 forms with the outer surface 108 of lip 102 a passageway or orifice generally designated 110.

The throat 74, bell-like member 80, plate member 84, collector 100, rod 104, bushing and pin assembly 106, as well as inner lining 96, are preferably made of a refractory material or one that is inert to the reaction conditions which are to be carried out in the reactor 40 and which will not erode under the high temperature, high fluid flow conditions. In the preferred case, tungsten is a suitable material but other materials such as molybdenum and the like will also suffice.

The throat member 74, bell-like member 80 and collector cup 100 generally define a high temperature or reaction zone 112 wherein a refractory metallic compound, for example, is reduced by a reductant such as hydrogen. Most of the chemical activity takes place within the throat member 74. However, theoretically, because of the turbulent conditions within the zone 112, reaction may take place throughout. The collector 100 in conjunction with place 84 and inner lining 96 form what may be considered a collection zone 114 generally within the area of the orifice or effluent passageway 110.

In practice, the reactor 40 is energized to produce a plasma generally in the area designated 116 proximate to the feeder material inlet (or inlets) 52. So that ease of viewing may be had through the viewports, and generally positioned at 62, not shown, a gas such as hydrogen may be injected at these port sites so as to keep the ports sufficiently cooled to permit visual observations of the interior of quench tank 54 above and below plate 84. As feed material is introduced directly into the plasma, for example a feed material such as tantalum pentachloride, which is carried by a carrier gas such as argon, chemical reaction because of available reductant and extremely high temperature takes place within zone 112 but predominantly within the confines of throat member 74.

An effluent from and within reaction zone 112 comprising vaporized elemental tantalum, hydrogen, hydrogen chloride from the reducing reaction, as well as unreacted tantalum pentachloride and argon, flows downward from the confines of throat 74, through a temperature gradient, into bell member 80 whereat because of the substantial pressure and temperature difference, a deposition of elemental tantalum begins to occur. The effluent passes through the passageway 110 through the length of the liner 92 and thence out through the outlet 71 of the quench tank for further treatment and/or recovery processing.

As the reaction is initiated, the collector cup 100 is positioned relative to the interior surface of plate 84 so as to provide a gap distance of about ⅛ inch between the interior surface 108 (FIG. 3) of edge 102 and the interior surface of plate 84. As the effluent follows the path heretofore described, elemental tantalum begins to form predominantly on the interior surface 108 of edge 102 in significant quantities. After a time, tantalum sponge donut is formed tending to completely block the gap or passageway 110 and hinder effluent flow to the extent that a back pressure begins to develop within reaction zone 112. When this occurs, the collector cup 100 is moved axially downwards (manually or otherwise) by means of rod 104 so as to maintain a pressure differential between reaction zone 112 and the interior of liner member 92 or collection zone 114 of about 0.5 to 5.0 p.s.i.g. with a preferred range being about two to three p.s.i.g. Obviously, instrumentation, not shown, is provided for this purpose. As the tantalum sponge donut begins to form and grow, more and more elemental tantalum is recovered in that the effluent must now also pass through the interstices of the porous sponge of elemental metal to thereby deposit more elemental metal therein and thereon.

In the apparatus depicted in FIG. 3, continuation of the process is carried on until the collector cup 100 is at or near the lowermost edge of linear 92 at which time the reactor 40 is shut down and allowed to cool. Thereafter, the bottom plate 68 is removed and the tantalum sponge donut scraped off the collector 100, the interior lining 96 and if need be, the other interior surfaces of the equipment. The recovered tantalum is found to have a size considerably larger than the sub-micron particles heretofore recovered in the prior art and is recovered in copious quantities at over-all yields in excess of 90% and at high purity levels. The refractory and other metals also exhibit unique physical properties heretofore unobserved in elemental metal production processes.

Referring now to FIG. 4, a similar type reactor as that depicted in FIG. 3 is schematically illustrated but differs therefrom in the respect that whereas the reactor 40 only permitted batchwise refractory metal production, the reactor 140 permits refractory metal recovery on a continuous basis.

The reactor 140 is essentially of the same construction as reactor 40 except as will be explained. The reactor head has been omitted since this structure is essentially the same as for the plasma reactor 40. It will be noted in this instance, that throat member 142 is slightly shorter than that previously described and upper cup member 144 is of slightly different shape than the bell-like member 80 in the previously described apparatus. A shortened formation zone for the metallic sponge is achieved by providing a shortened liner 146 adequately supported from the interior walls of the quench tank as by means of supports 148 and 150.

A collector 152 is of generally more cylindrical shape than the collector 100 previously described.

Once the elemental metal has deposited in the form of a sponge donut or porous cylinder (shown on the exterior of collector 152 positioned in the phantom position) substantially the length of the liner 146, the collector 152 is moved to the phantom line position shown and a plurality of rods 156 are brought into the relative positions shown. When the collector 152 is moved upwards back into the full line position shown, the rods engage the sponge donut breaking it free or scraping it from collector 152 allowing it to fall to the bottom of the quench tank whereat is positioned a leg-supported receptacle or dish 158 which receives the dislodged metal sponge.

Thus, there is no need to cool down the reactor 140 each time the donut sponge formation is formed, and the only limitation to continuous operation of reactor 140 is the capacity of receptacle or catcher pan 158. However, and as is obvious to those of ordinary skill in the art, an automatic conveyor, rake or any such means may be employed for removing both the pan 158 and the accumulated elemental metal contained therein from the bottom of the quench tank without difficulty.

As was the case in the reactor 40, the rods 156 and the pan 158 are of inert materials such as for example, tungsten, so as not to contaminate the elemental metal recovered. The mode of operation of the device 140 is essentially the same as that described for the device with the exceptions hereinbefore noted.

A plasma generator was constructed according to principles well known to the state of the art and was positioned in axial alignment with a feeder ring plate or member such as 46 of stainless steel material and having four feeder material inlets angularly disposed as shown in FIG. 3. A boron nitride, annular insert having an inside diameter of 0.5 inch, a thickness at the lower extremity of 0.125 inch, and being 1.0 inch long was positioned adjacent the feed ring member 46 and is generally identified as member 50 in FIG. 3.

Supported on the graphite spacer 78 was a throat member 74 of tungsten having an inside diameter of 2.1875 inches, a wall thickness of 0.0937 inch and a strength of about 3.25 inches.

A tungsten bell member 80 having an inside diameter of approximately 4.500 inches and being about 3.25 inches long with a 0.125 inch wall thickness was positioned as shown in FIG. 3 with the lower extremity of throat 74 projecting about 1.5 inches into the bell member 80.

Bell member 80 was supported on plate member 84 being of tungsten material 0.125 inch thick, and a diameter of 11.500 inches with a central aperture of 4.500 inches opening into the interior of bell member 80. Plate 84 was supported within the quench member 54 by a stainless steel ring 90, ¼ x ½ inch, tack welded to the inner wall of quench thank 54.

The liner 92 comprised graphite sleeve 94 of 0.375 inch wall thickness and was approximately 6.3750 inches in diameter, with an approximate length of about 12 inches. An interior surface 96 of tungsten approximately 0.020 inch thick completed the interior of the liner member 92. Member 92 was supported by a stainless steel ring such as 98 and as shown in FIG. 3.

The collector cup or member 100 comprised a cup of approximately 4.500 inches inside diameter, a length of 4.0 inches, and was fabricated of tungsten having a wall thickness of 0.125 inch. The support rod 104 was a 0.3750 inch diameter tungsten shaft secured to cup 100 by means of tungsten bushing and tungsten pin assembly 106 substantially as shown in the figure. The outlet passageway 71 from quench tank 54 through which effluent flowed, was about 1.0 inch in diameter.

Using an apparatus as immediately described above, a series of experimental runs was conducted wherein the effluent passageway 110 was varied from about ⅛ to ¼ inch to vary the differential pressure between reaction zone generally indicated at 112 and the collection zone 114 within the interior of the liner member 92. This procedure also affected temperature conidtions within reaction zone 112. By varying the passageway 110, larger or smaller elemental metal particles were selectively obtained by means of forming a metallic sponge cylinder or donut approximately 15 centimeters in diameter, 2 centimeters thick and a length which varied depending upon the length of each run.

Average temperature conditions in the reaction zone 112 were calculated to be within the range of about 1,800–2,850° K. and the temperature of the flow through or waste effluent was measured to be within the range of 200–550° C. From the quench tank outlet 71 the effluent was put through a cyclone recovering apparatus of conventional type to obtain additional elemental metals of sub-micron size.

The in situ formed elemental metal sponge was found to have individual particles exhibiting a necking property to produce inter-connected particles forming a porous structure and which upon grinding and sieving produced elemental particles or powder of the one to ten micron size determined by gas permeability using the Fisher sub-sieve sizer technique. The unique configuration of the metallic sponge was ascertainable by means of photomicrographs clearly indicating the unique structural characteristics of the elemental metals obtained in the practice of the herein-disclosed invention.

Analysis of the various metals obtained indicated that refractory metals of extremely high purity levels were obtained. In order to verify in several of the instances what material was being collected in the metallic sponge form, samples were determined to exhibit X-ray diffraction patterns identified as molybdenum, tantalum and tungsten respectively, having a cubic or crystalline structure.

As indicated, using the reactor already described, a series of runs was made to obtain elemental tantalum. The feed material was tantalum pentachloride and the results are accurately depicted in the following Table I, Table II and Table III.

TABLE I

| | Power | | | | Gas | | Feed and recovery | | | | | |
|---|---|---|---|---|---|---|---|---|---|---|---|---|
| Run No. | Kw. (gross) | Kw. (net) | Head eff'y, percent | Calc. reaction, °K. | H₂ stab. flow, s.c.f.h. | Feed carrier flow, s.c.f.h. | Feed rate contained Ta, lb./hr. | Feed time, hours | Total contained Ta, pounds | Ta sponge, pounds | Ta fines, pounds | Percent of total (t) conversion recovered in sponge form |
| A | 76.6 | 26.6 | 37.7 | 2,870 | 663 | 148 (He) | 32.6 | 0.47 | 7.74 | 6.67 | 1.07 | 86.2 |
| B | 71.4 | 26.7 | 37.4 | 2,956 | 663 | 178 (He) | 17.3 | 0.75 | 6.59 | 4.15 | 1.88 | 63.0 |
| C | 63.0 | 26.5 | 42.0 | 2,600 | 800 | 266 (He) | 21.8 | 0.67 | 7.41 | 4.13 | 3.34 | 56.0 |
| D | 65.3 | 40.6 | 62.2 | 2,980 | 883 | 198 (Ar) | 43.4 | 0.21 | 4.52 | 1.98 | 0.84 | 44.0 |
| E | 62.2 | 35.4 | 56.6 | 2,825 | 883 | 198 (Ar) | 12.5 | 0.48 | 4.06 | 2.97 | 0.71 | 73.2 |
| F | 65.2 | 37.8 | 58.0 | 2,850 | 883 | 198 (Ar) | 18.3 | 0.48 | 4.43 | 3.55 | 0.48 | 80.3 |
| G | 66.4 | 37.8 | 57.0 | 2,886 | 883 | 198 (Ar) | 23.6 | 0.28 | 3.41 | 2.72 | 0.29 | 80.3 |
| H | 65.8 | 37.0 | 56.3 | 2,865 | 883 | 198 (Ar) | 21.8 | 0.37 | 4.08 | 2.51 | 1.14 | 61.6 |
| I | 64.8 | 30.5 | 47.0 | 2,800 | 773 | 198 (Ar) | 16.7 | 0.36 | 4.12 | 1.75 | 1.86 | 47.8 |
| J | 64.5 | 36.1 | 55.8 | 2,842 | 883 | 198 (Ar) | 21.2 | 0.35 | 3.76 | 3.09 | 0.73 | 83.5 |
| K | 61.8 | 34.7 | 56.1 | 2,800 | 833 | 198 (Ar) | 21.1 | 0.34 | 3.67 | 2.89 | 0.41 | 78.4 |
| L¹ | 65.0 | 37.2 | 57.2 | 2,856 | 883 | 198 (Ar) | 24.0 | 0.37 | 4.58 | 3.96 | 0.38 | 86.5 |
| M¹ | 61.6 | 36.4 | 51.5 | 2,710 | 883 | 198 (Ar) | 24.3 | 0.40 | 4.88 | 4.19 | 0.59 | 86.0 |
| N¹ | 64.4 | 34.2 | 53.1 | 2,800 | 883 | 198 (Ar) | 22.0 | 0.42 | 4.73 | 3.93 | 1.03 | 83.0 |

¹ ¼" tungsten rods placed in effluent flow below collector cup.
(t) Over-all total conversion including fines ranged from 62.0%–98.2%.

TABLE II.—AVERAGE CONDITIONS PER RUN

| Runs | Ta in feed | | Sponge | | | Fines | | | Power | | | | SCFH gas | | |
|---|---|---|---|---|---|---|---|---|---|---|---|---|---|---|---|
| | Lbs. total | Lb./hr. | Lbs. total | Lb./hr. | Percent of feed | Lbs. total | Lb./hr. | Percent of feed | Kw. (gross) | Kw. (net) | Eff'y percent | Calc. react. temp. | $H_2$ stab. | $H_2$ stoich. mult. | Feed carrier (Argon) |
| E thru N | 4.2 | 10.87 | 3.16 | 8.23 | 76.1 | 0.76 | 1.97 | 18.0 | 64.2 | 35.7 | 55.0 | 2,823 | 883 | 15.22 | 198 |
| L thru N | 4.73 | 12.12 | 4.03 | 10.33 | 85.0 | 0.67 | 1.70 | 14.1 | 63.7 | 35.9 | 56.4 | 2,889 | 883 | 13.6 | 198 |

TABLE III.—FISCHER SUB SIEVE (ANALYSIS)

Runs J and K —200 mesh

| Porosity setting: | Microns |
|---|---|
| .80 | 1.95 |
| .75 | 1.50 |
| .70 | 1.83 |
| .65 | 2.04 |
| .62 | 1.90 |

Run L —200 mesh

| Porosity setting: | Microns |
|---|---|
| .80 | 0.90 |
| .75 | 1.10 |
| .70 | 1.30 |
| .65 | 1.48 |
| .62 (1.60) | 1.45 |

Run M —200 mesh

| Porosity setting: | Microns |
|---|---|
| .80 | 1.15 |
| .75 | 1.25 |
| .70 | 1.55 |
| .65 | 1.51 |
| .62 | 1.65 |

Run N —200 mesh

| Porosity setting: | Microns |
|---|---|
| .80 | 8.4 |
| .75 | 1.92 |
| .70 | 2.30 |
| .65 | 2.21 |
| .62 | 2.2 |

Run M +200 −100 mesh

| Porosity setting: | Microns |
|---|---|
| .75 | 8.40 |
| .70 | 6.40 |
| .65 | 6.40 |

Run N +200 −100 mesh

| Porosity setting: | Microns |
|---|---|
| .80 | 7 |
| .75 | 8 |
| .70 | 6.8 |
| .65 | 5.9 |
| .60 | 5.3 |

Run M +200 −200 50/50

| Porosity setting: | Microns |
|---|---|
| .80 | 7.20 |
| .75 | 5.20 |
| .70 | 3.05 |
| .65 | 2.45 |
| .62 | 2.35 |
| .62 | 2.35 |

Run N +200 −200 50/50

| Porosity setting: | Microns |
|---|---|
| .80 | 4.95 |
| .75 | 4.2 |
| .725 | 3.95 |
| .70 | 3.05 |
| .675 | 2.80 |
| .650 | 2.80 |
| .625 | 2.80 |
| .60 | 2.80 |
| .575 | 2.85 |

Tantalum powder produced and recovered as heretofore described was subjected to analysis to determine the purity thereof. Results of the analysis are accurately depicted in Table IV below in parts per million.

TABLE IV

| Impurity: | P.p.m. |
|---|---|
| Nb | <30 |
| Mo | <10 |
| Fe | 16 |
| Cr | <3 |
| Ni | <3 |
| Mn | <1 |
| Co | <5 |
| V | <3 |
| Ti | <10 |
| Zr | <10 |
| Cu | <1 |
| Sn | <3 |
| Bi | <1 |
| Pb | <3 |
| Ca | <10 |
| Mg | <1 |
| Al | <1 |
| Si | <10 |
| $O_2$ | 1400 |
| $H_2$ | 1000 |
| $N_2$ | 1400 |
| Cl | 1600 |
| C | 110 |

Tests were conducted of electrical properties of capacitor anodes made from tantalum powder produced from the practice of the invention. A commonly accepted criterion of quality of capacitor anodes is the product of the capacitance and test voltage per unit weight of anode material. The tests indicate that the CV product per gram is comparable to powders in commercial use.

Anodes sintered at 1900° gave CV/g. values in the approximate range 2900–3360 and with a 2000° sinter, 2400–2600. At a sintering temperature of 1800°, CV/g. of approximately 4000–5100 were found.

The DC leakage current was one-quarter to one-half microampere in anodes sintered at 2000°.

Using the apparatus depicted in FIG. 4 several runs were conducted to test the efficacy of the method and device in the continuous production of elemental refractory metals. The feed material consisted of columbium pentachloride fluidized with argon carrier gas. The reductant consisted of hydrogen.

After a period of running time a metallic sponge formed on the collector cup 152. The cup was lowered and rods 156 inwardly positioned to rake off the formation product when the cup 152 was moved back into its initial position. Formation product fell into the receptacle 158. This procedure was repeated and the test then terminated.

The formation product was subjected to analysis and determined to be columbium. Of total theoretical recovery, 81.5% of the columbium was recovered in the sponge donut form, while 17.8% of the metal was additionally recovered for a total over-all recovery of 99.3%. Spectrographic analysis indicated that the columbium was of pure form as follows:

| Impurity: | Weight percent |
|---|---|
| Si | .006 |
| Mm | Trace |
| Fe | Trace |

| Impurity | Weight percent |
| --- | --- |
| Mg | Trace |
| Ca | Trace |
| Al | .02 |
| Al | .02 |
| Cu | .05 |
| Ti | .08 |
| Wet analysis: | |
| Cl | .05 |
| O$_2$ | .150 |

The efficacy of the apparatus and method of the invention, as well as the range of applicable chemical reactions, was demonstrated by several experimental runs accurately tabulated in Table V.

TABLE V

| Run No. | Head eff'y percent | H$_2$ stab. flow, SCFH | Feed carrier flow, SCFH (Ar) | Feed | Metal recovered (g.) | Percent of theoretical |
| --- | --- | --- | --- | --- | --- | --- |
| 1 | 26 | 595 | 47 | WO$_3$ | 246 | 40.7 |
| 2 | 56.6 | 883 | 198 | (NH$_4$)$_6$Mo$_7$O$_{24}$·4H$_2$O | 2487 | 86 |
| 9 | 66.7 | 883 | 198 | (NH$_4$)$_{10}$W$_{12}$O$_{41}$·5H$_2$O | 4,335 | 90.3 |

It will be readily observed from the foregoing detailed description, examples and data that numerous variations and modifications may be effected without departing from the essence and scope of the invention hereof.

While recovery of the metallic sponge, which is reducible to powders, is preferable in certain cases, a massive metal formation is also possible. By controlling the prolonged exposure of the metallic sponge to the high temperatures generated, a metal product of substantially solid form can be produced. These, as well as other intrinsic variances, will be apparent to workers in the art.

We claim:

1. In the process of forming elemental metals using a plasma reactor the improvement which comprises:
   (a) Passing a reducible metallic compound into the reaction zone of said reactor under reduction conditions;
   (b) Passing the effluent from the reactor zone into a collection zone of variable differential fluid pressure and temperature; and
   (c) Maintaining a selected differential fluid pressure and temperature between said collection zone and said reactor zone and recovering elemental metal collected therein of selected characteristics.

2. The process in accordance with claim 1 wherein refactory metal compounds are reduced in said reactor zone.

3. The process in accordance with claim 2 wherein refactory metals are formed.

4. In the plasma-reactor process of producing elemental metals, the improvement which comprises:
   (a) Introducing a reducible reactant at a point downstream from the anode of said reactor under reduction conditions;
   (b) Directing the effluent flow from the reaction zone through a selectively variable passageway or gap in a selectively controlled manner into a collection zone; and
   (c) Collecting the elemental metal while maintaining selective control of said effluent flow.

5. The process in accordance with claim 4 wherein a temperature gradient and pressure differential is maintained between said reaction zone and said collection zone.

6. The process in accordance with claim 5 wherein the reactant comprises a reducible refractory metal compound and the temperature in said reaction zone is sufficient to carry out a reduction reaction.

7. The process in accordance with claim 6 wherein the plasma gas is hydrogen and a plasma jet is formed in proximity to the point of reactant introduction.

8. The process in accordance with claim 7 wherein said pressure differential between said reaction zone and said collection zone is within the range of about 0.5 to 5 p.s.i.

9. The process in accordance with claim 8 which additionally includes positioning a collection member adjacent said passageway and allowing said metal to form thereon.

10. The process in accordance with claim 9 wherein said refractory compound is a halide.

11. The process in accordance with claim 10 wherein said halide is tantalum pentachloride and the elemental metal recovered is tantalum in sponge form.

References Cited

UNITED STATES PATENTS

| 3,211,548 | 10/1965 | Scheller et al. | 75—0.5 BB |
| 3,257,196 | 6/1966 | Foex | 75—0.5 BB |
| 3,475,158 | 10/1969 | Nevenschwander | 75—0.5 BB |

WAYLAND W. STALLARD, Primary Examiner

U.S. Cl. X.R.

75—0.5 BA, 0.5 BB, 84, 84.4, 84.5